May 14, 1968     R. G. MORRIS     3,382,704

CORBINO DISK MAGNETO-THERMAL CONDUCTIVITY DEVICE

Filed Feb. 23, 1965

INVENTOR
ROBERT G. MORRIS

BY *Richard J. Miller*

ATTY.

United States Patent Office 3,382,704
Patented May 14, 1968

3,382,704
CORBINO DISK MAGNETO-THERMAL
CONDUCTIVITY DEVICE
Robert G. Morris, Rapid City, S. Dak., assignor, by mesne assignments, to the United States of America as represented by the Secretary of the Navy
Filed Feb. 23, 1965, Ser. No. 434,721
6 Claims. (Cl. 73—15)

ABSTRACT OF THE DISCLOSURE

This invention relates to a device for accurately measuring the magnetic dependence of thermal conductivity of a material which is accomplished by providing a circular, planar test specimen having a source of heat centrally disposed in said test specimen and having a heat sink disposed about the outer periphery and a magnetic field perpendicular of the plane of the test specimen.

This invention relates to a device for conducting magnetic measurements and more specifically for an apparatus capable of measuring the magnetic dependence of thermal conductivity within a specimen.

Previous methods of measurement of magnetic field dependence of thermal conductivity have used specimens in the form of a cylinder with heat flow along the axis of the cylinder. A magnetic field is applied parallel or perpendicularly to the axis of the cylinder. This arrangement has the following disadvantages:

The magnetic field causes a temperature gradient to form perpendicular to the magnetic field and to the heat flow. The gradient opposes the action of the magnetic field and results in a reduced magnetic field dependence of the thermal conductivity. The second disadvantage is that the transverse temperature difference is difficult to measure or control and this makes comparison of the experimental results with theoretical results difficult.

It is therefore an object of this invention to provide a new apparatus for measuring the magnetic field dependence of thermal conductivity utilizing a new geometry.

It is a further object of this invention to provide an apparatus for measuring field dependence of thermal conductivity which does not produce a temperature gradient perpendicular to the magnetic field and a heat flow which will oppose the heat action of the magnetic field.

It is yet a further object of this invention to provide a geometry which does not partially short out the thermomagnetic effect by the end geometry of a rectangular specimen.

It is yet a further object of this invention to provide for measurement of isothermal rather than adiabatic thermal conductivity since the isothermal conductivity is easier to calculate theoretically.

It is still a further object of this invention to provide an apparatus for measuring the magnetic dependence of thermal conductivity, comprising: means for holding circular planar specimen to be tested, means for heating the specimen at the center, means for removing heat from its outer edge, heat shield means positioned on either side of the test specimen, means for generating a magnetic field perpendicular to the plane of the specimen, and means for the recording temperature gradiant in the specimen and the heat shield.

Other objects, advantages and novel features of the invention will become apparent from the following detailed description of the invention when considered in conjunction with the accompanying drawings wherein.

Figure 1:
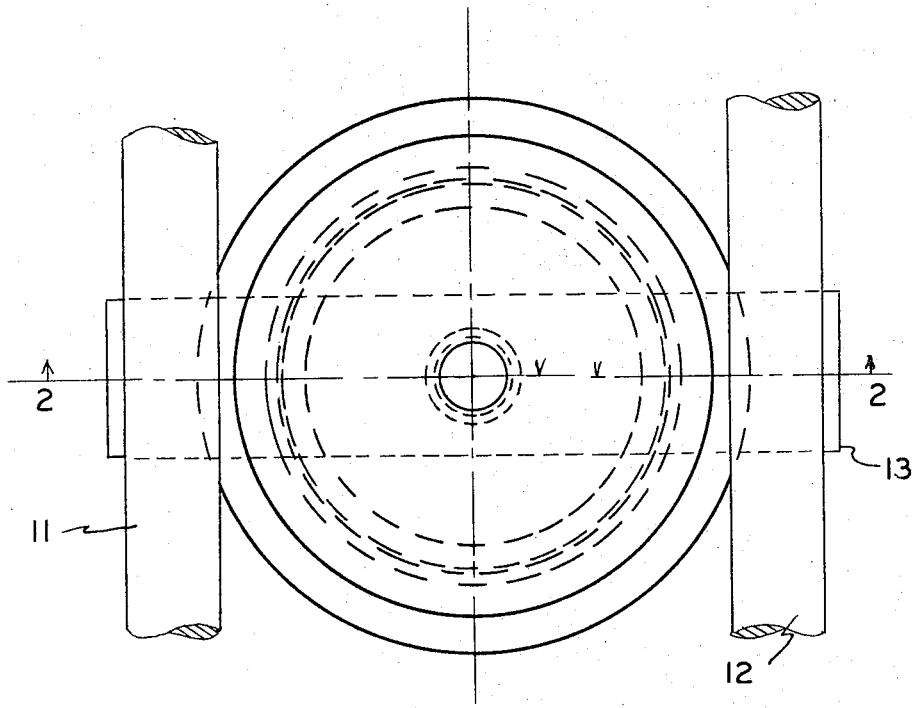
FIGURE 1 is a top view of one embodiment of the invention.
Figure 2:
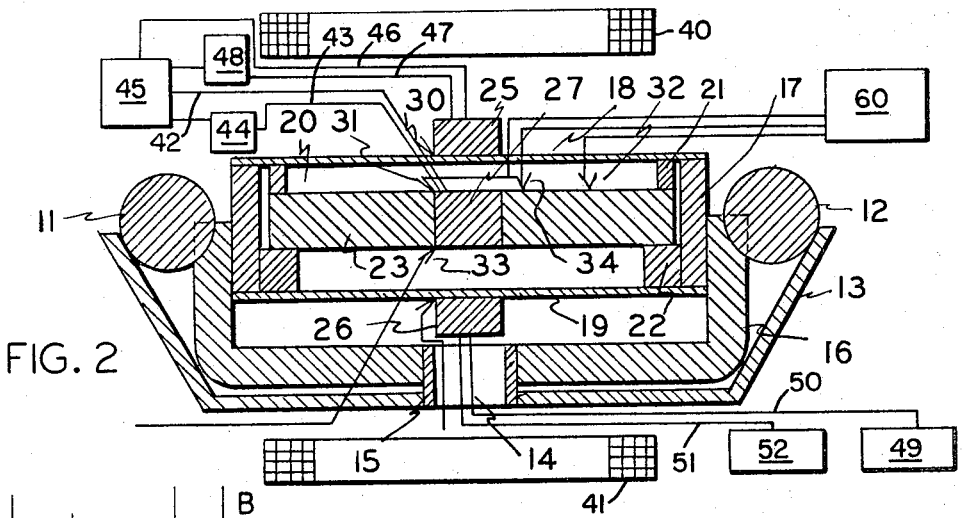
FIGURE 2 is a sectional view along lines 2—2 in FIGURE 1.

More specifically FIGURES 1 and 2 show apparatus for performing the objects of this invention and include a pair of support rods 11, 12 affixed in a suitable manner to a support bracket 13. An air passageway 14 is shown in the support bracket 13 and is coupled by a sleeve 15 to an outer heat sink 16. The outer sink is of a cylindrical shape having a suitable means for affixing thereto an inner cylindrical heat sink 17.

A pair of heat shields 18 and 19 completely enclose a cylindrical volume, shown generally as 20, within which is mounted a circular, planar specimen 23 to be tested. Cylindrical members 21 and 22 mount specimen 23 substantially equi-distant from the heat shields 18, 19. First and second heater elements 25 and 26 are mounted to the heat shields 18 and 19, and a third heater element 27 is centrally disposed within the specimen 23.

A plurality of thermo-couples 30, 31, 32, 33, and 34 are provided for measuring temperatures and for controlling the operation of the test apparatus as specified hereinafter.

A pair of coils 40, 41 are shown in FIGURE 2 whose function is to provide a magnetic field perpendicular to the plane of test specimen 23. Additionally, there is shown connected to heater 27 by a pair of leads 42, 43 a current meter 44 and a source of power 45. Heater element 25 is connected by leads 46, 47 to power source 45 through a current meter 48. A second power source 49 is shown connected through leads 51, 52 and current meter 52 to heater element 26. Leads are provided to the various thermo-couple elements to provide a circuit for sensing temperature changes. A temperature recording device 60 is shown coupled to the thermo-couples 31, 32, and 34. In a similar manner thermo-couples 30, 33 would be coupled to the recording device, although the connections are not shown.

Heat shields 18, 19 balance the heating by external control of the heating coils as shown. Thus, in operation the balancing is done by control of the external coil controls in the circuit as shown.

The Righi-Leduc effect is defined as follows. If heat is flowing through a strip of metal and the strip is placed in a magnetic field perpendicular to its plane, a temperature difference develops across the strip transverse to the directions of heat flow and applied magnetic field. This effect bears the same relation to the Nernst effect that the Ettingshausen effect bears to the Hall effect. It will be regarded as analogous to the Hall effect, but with a longitudinal flow of heat replacing the electric current and transverse temperature difference replacing the potential difference. If, to one looking along the strip in the direction of the heat flow, and with the magnetic field downward, the decrease of temperature is towards the right, the effect is said to be positive. It is positive in iron and negative in bismuth.

It is obvious in measuring the magnetic field dependence of thermal conductivity in a strip that a temperature gradient mutually perpendicular to the magnetic field and the temperature flow exists. A countering effect is established and the inner reactions are difficult to obtain and isolate.

Figure 3:
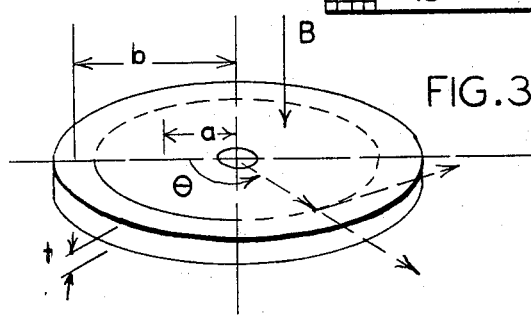
FIGURE 3 is a schematic presentation of the physical laws operating within the invention.

In the invention as disclosed in this application this temperature effect is overcome by providing the circular geometry wherein the magnetic field B, as shown in FIGURE 3, is perpendicular to the plane of the specimen 23 and the heater element 27 is centrally disposed within the specimen and the heat sink 17 is a cylindrical sink disposed about the outer periphery of the specimen, no circular component of temperature gradient will exist, mathematically this can be shown in the following manner.

With a radial temperature gradient $\partial T/\partial r$ and perpendicular magnetic induction B, the radial and $\theta$ component of the heat current density are given by:

$$W_r = -K\frac{\partial T}{\partial r} - SBK\frac{\partial T}{r\partial \theta}$$

$$W_\theta = SBK\frac{\partial T}{\partial r} - K\frac{\partial T}{r\partial \theta}$$

Where K equals isothermal thermal conductivity
Where S equals Righi-Leduc coefficient.

For a disk-shaped specimen $$\frac{\partial T}{\partial \theta} = 0$$

$$W_r = -K\frac{\partial T}{\partial r}$$

$$W_\theta = SBK\frac{\partial T}{\partial r}$$

Total heat current Q at any radius $r$ is $2\pi r t W_r$ so that $$W_r = \frac{Q}{2\pi r t}$$

$t$ = thickness of disk
therefore $$\frac{\partial T}{\partial r} = \frac{-Q}{2\pi K r t}$$

The temperature difference between points $a$ and $b$ is $$T_b - T_a = \int_a^b \frac{\partial T}{\partial r} dr = \frac{-Q}{q\pi K t}\int_a^b \frac{dr}{r} = \frac{-Q}{2\pi K T} tr\frac{b}{a}$$

Thus, $$K = \frac{QLn(b/a)}{2\pi t(T_a - T_b)}$$

In operation the heat Q is maintained constant and is measured by electrical power supplied to the heater. Temperatures $T_a$ and $T_b$ are measured by thermo-couples attached to the specimen. Dimensions $b$, $a$, and $t$ are measured. Measurements of $T_A$ and $T_B$ are made at each magnetic induction B and then the thermal conductivity K can be calculated at each value of magnetic induction.

It can readily be seen from the figures that heat injected by heater 27 into the apertured center of test specimen 23 flows outwardly in a radial direction to heat sink 17 and thus establish a temperature gradient. A temperature gradient is generated perpendicular to the heat flow along the radii of specimen 23 by the Righi-Leduc effect and is in fact a loop which reduces to zero. By measuring the electric current flow into electrical heater 27 and to heaters 25 and 26; and by balancing the heat in shields 18 and 19 to that of specimen 23 the total heat flow is known and a very accurate and sensitive apparatus is disclosed for measuring the effect and the temperature dependence of heat flow under the influence of different magnetic fields. Admittedly, the effect measured by the disclosed apparatus is a subtle one, but necessary, as increases in accuracy of the measurement of such effects is always desirable.

Obviously many modifications and variations of the present invention are possible in the light of the above teachings. It is therefore to be understood that within the scope of the appended claims the invention may be practiced otherwise than as specifically described.

I claim:

1. An apparatus for measuring the magnetic field dependence of thermal conductivity in a specimen, comprising:
    (a) means for holding a circular, planar specimen to be tested;
    (b) means for heating said specimen at its center;
    (c) means for removing heat from the outer edge of said specimen;
    (d) heat shield means positioned on either side of said test specimen;
    (e) means for generating a magnetic field perpendicular to the plane of said specimen; and
    (f) means for recording temperature gradients in said specimen and heat shields.

2. An apparatus for measuring the magnetic field dependence of thermal conductivity in a specimen, comprising:
    (a) means for holding a circular, planar specimen to be tested, said specimen having a center and an outer edge;
    (b) means for heating said specimen at its center;
    (c) means for removing heat from said outer edge of said specimen to establish a temperature gradient in said test specimen;
    (d) heat shield means positioned on either side of said test specimen;
    (e) means for generating a magnetic field perpendicular to the plane of said specimen;
    (f) means for recording temperature gradients in said specimen and heat shields, and
    (g) means for heating said heat shield means to establish therein temperature gradients having a controllable relationship to the temperature gradient in said test specimen.

3. An apparatus for measuring the magnetic field dependence of thermal conductivity in a specimen, comprising:
    (a) means for holding a circular, planar specimen to be tested, said specimen having a center and an outer edge;
    (b) means including an electrical heater element for heating said specimen at its center;
    (c) means for removing heat from said outer edge of said specimen to establish a temperature gradient in said test specimen;
    (d) heat shield means positioned on either side of said test specimen;
    (e) means for generating a magnetic field perpendicular to the plane of said specimen;
    (f) means for recording temperature gradients in said specimen and heat shields;
    (g) means including electrical heater elements for heating said heat shield means to establish therein temperature gradients having a controllable relationship to the temperature gradient in said test specimen; and
    (h) means for measuring the electrical currents in said heater elements to determine actual heat flow from said center to said outer edge.

4. An apparatus for measuring the magnetic field dependence of thermal conductivity in a specimen, comprising:
    (a) means, including a circular housing and circular spacer members, for holding a circular, planar specimen to be tested, said specimen having an apertured center and an outer edge;
    (b) means, including an electrical heater element in said apertured center, for heating said specimen;
    (c) means for removing heat from said outer edge of said specimen to establish a temperature gradient in said test specimen;
    (d) heat shield means positioned on either side of said test specimen and spaced therefrom by said spacers;
    (e) means for generating a magnetic field perpendicular to the plane of said specimen;
    (f) means for recording radial temperature gradients in said specimen and heat shields;
    (g) means for heating said heat shield means to establish therein temperature gradients having a controllable relationship to the temperature gradient in said test specimen; and (h) means for measuring the electrical currents in said heater elements to determine actual radial heat flow from said center to said outer edge.

5. An apparatus for measuring the magnetic field dependence of thermal conductivity in a specimen, comprising:
(a) means including a circular housing and circular spacer members for holding a circular, planar specimen to be tested, said specimen having an apertured center and an outer edge;
(b) means, including an electrical heater element in said apertured center for heating said specimen;
(c) means, including an annular heat sink in contact with said outer edge for removing heat from said outer edge of said specimen to establish a temperature gradient in said test specimen;
(d) heat shield means positioned on either side of said test specimen and spaced therefrom by said spacers;
(e) means for generating a magnetic field perpendicular to the plane of said specimen;
(f) means for recording radial temperature gradients in said specimen and heat shields;
(g) means for heating said heat shield means to establish therein temperature gradients having a controllable relationship to the temperature gradient in said test specimen; and
(h) means for measuring the electrical currents in said heater elements to determine actual radial heat flow from said center to said outer edge.

6. An apparatus for measuring the magnetic field dependence of thermal conductivity in a specimen, comprising:
(a) means for holding a circular, planar specimen to be tested, said specimen having an aperture at its center;
(b) means disposed in said aperture for heating said specimen;
(c) means for removing heat from the outer edge of said specimen;
(d) heat shield means positioned on either side of said specimen to be tested;
(e) means for generating a magnetic field perpendicular to the plane of said specimen; and
(f) means for recording temperature gradients in said specimen and heat shields.

References Cited

I. B. Fieldhouse and J. I. Lang: Measurement of Thermal Properties, W.A.D.D. Technical Report 60–904, July 1961, pp. 4–7.

Robert G. Morris and Fred Hornstra Jr.: Measurement of Thermal Conductivity in a Magnetic Field by the Series Comparative Method, The Review of Scientific Instruments, vol. 33, No. 10, October 1962, pp. 1067–1068.

JAMES J. GILL, *Primary Examiner.*

RICHARD C. QUEISSER, *Examiner.*

EDDIE E. SCOTT, *Assistant Examiner.*